US012090771B2

(12) United States Patent
Breunig et al.

(10) Patent No.: US 12,090,771 B2
(45) Date of Patent: Sep. 17, 2024

(54) PRINTING MACHINE COMPRISING A PLURALITY OF INKJET PRINT HEADS ARRANGED TOGETHER IN A PRINTING UNIT

(71) Applicant: KOENIG & BAUER AG, Würzburg (DE)

(72) Inventors: Hartmut Breunig, Arnstein (DE); Simon Stahl, Wiesenbronn (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/685,542

(22) PCT Filed: Jan. 26, 2023

(86) PCT No.: PCT/EP2023/051878
§ 371 (c)(1),
(2) Date: Feb. 22, 2024

(87) PCT Pub. No.: WO2023/160936
PCT Pub. Date: Aug. 31, 2023

(65) Prior Publication Data

US 2024/0262110 A1 Aug. 8, 2024

(30) Foreign Application Priority Data

Feb. 22, 2022 (DE) ..................... 10 2022 104 137.9

(51) Int. Cl.
*B41J 11/00* (2006.01)
*B41J 3/407* (2006.01)
*B41J 3/54* (2006.01)

(52) U.S. Cl.
CPC ............... *B41J 3/543* (2013.01); *B41J 3/407* (2013.01); *B41J 11/007* (2013.01); *B41J 11/009* (2013.01)

(58) Field of Classification Search
CPC ........ B41J 2/155; B41J 2/2117; B41J 2/2114; B41J 2/21; B41J 2/2146; B41J 2/5056;
(Continued)

(56) References Cited

U.S. PATENT DOCUMENTS

2011/0234665 A1* 9/2011 Sumi ........................ B41J 23/02
347/19
2016/0355006 A1* 12/2016 Reder ........................ B41J 2/21
(Continued)

FOREIGN PATENT DOCUMENTS

DE 102014208896 A1 11/2015
DE 102018207245 A1 11/2019
(Continued)

OTHER PUBLICATIONS

International Search Report of PCT/EP2023/051878 dated Apr. 21, 2023.

*Primary Examiner* — Scott A Richmond
(74) *Attorney, Agent, or Firm* — MATTINGLY & MALUR, PC

(57) ABSTRACT

A printing machine includes a plurality of inkjet print heads arranged together in a printing unit and controlled by a control unit. At least two of the inkjet print heads are jointly arranged in relation to a stationary position in a transport path at a printing nip. The control unit activates a first inkjet print head when a substrate of a first substrate type moves past the stationary position, and activates a second inkjet print head when a substrate of a second substrate type moves past the stationary position. The first substrate type and the second substrate type differ from each other in material and/or nature of a surface to be printed. The inkjet print heads arranged in the printing unit are each configured to print an ink that comprises at least one colorant, both for the first substrate type and for the second substrate type.

14 Claims, 3 Drawing Sheets

(58) Field of Classification Search
CPC . B41J 2/515; B41J 2/525; B41J 11/007; B41J 11/009; B41J 11/42; B41J 11/04; B41J 2002/16591
See application file for complete search history.

(56) References Cited

U.S. PATENT DOCUMENTS

2020/0391516 A1* 12/2020 Date .................... B41J 29/393
2021/0300086 A1 9/2021 Osakabe et al.

FOREIGN PATENT DOCUMENTS

JP 2021-194895 A 12/2021
WO 2015/079680 A1 6/2015

* cited by examiner

PRINTING MACHINE COMPRISING A PLURALITY OF INKJET PRINT HEADS ARRANGED TOGETHER IN A PRINTING UNIT

CROSS-REFERENCES TO RELATED APPLICATIONS

This application is the US national phase, under 35 USC § 371, of PCT/EP2023/051878, filed on Jan. 26, 2023, published as WO 2023/160936 A1 on Aug. 31, 2023, and claiming priority to DE 10 2022 104 137.9, filed Feb. 22, 2022, and all of which are incorporated by reference herein in their entireties.

TECHNICAL FIELD

The examples herein relate to a printing machine comprising a plurality of inkjet print heads arranged together in a printing unit. The inkjet print heads are controlled by a control unit and arranged in such a way that, using the inkjet print heads, at least one substrate that is moved relative to the inkjet print heads by way of a transport device can be printed with an ink discharged by the inkjet print heads. In the printing unit, at least two of these inkjet print heads are jointly arranged, in relation to a certain stationary position in the printing machine in the transport path of the relevant substrate, at a printing location assigned to one of these positions in the transport path of the relevant substrate. The control unit is configured to activate a first of the inkjet print heads arranged at the relevant printing location when a substrate of a first substrate type moves past the relevant stationary position in the transport path of the relevant substrate. The control unit is further configured to activate a second of the inkjet print heads arranged at the relevant printing location when a substrate of a second substrate type moves past the relevant stationary position in the transport path of the relevant substrate. The first substrate type and the second substrate type are configured to differ from one another in terms of the material thereof and/or the nature of a surface to be printed.

BACKGROUND

A printing machine is known in each case from DE 10 2014 208 896 A1 and DE 10 2018 207 245 A1, wherein the respective printing machine has at least one transport path, which is intended for transporting substrate, and a plurality of inkjet print heads controlled by a control unit.

A printing machine is known from WO 2015/079680 A1, in which a reaction liquid is applied to a print substrate in an inkjet printing process upstream from the printing operation of the print substrate in the transport direction, wherein differing reaction liquids are applied as a function of whether a paper-based print substrate or a film-based print substrate is being printed.

A method for producing a printed product by way of an inkjet printer configured as a flatbed printer is known from JP2021-194895A, wherein the print substrate is a textile and made of a woven fabric, wherein a plurality of inkjet print heads are provided, which apply various inks, and wherein the mass ratio of the inks to be applied from the different inkjet print heads onto the relevant print substrate can be variably set as a function of the print substrate to be printed.

In industrial digital printing, the ink to be applied onto a substrate in a printing machine comprising an inkjet print head for the creation of a print image must be matched, in terms of the chemical and/or physical, for example rheological, properties thereof, to the material and/or the nature of a surface of the relevant substrate to be printed, so as to achieve an optimal print result. This means that a respective ink that is adapted, in terms of the properties thereof, to the relevant substrate must be used in the particular printing process, and consequently a multiplicity of different inks that differ chemically and/or physically must be employed.

For example, a substrate to be printed in a printing machine comprising an inkjet print head may, for example, be a paper produced from at least one fibrous material, or a print substrate made of a plastic material or metal, wherein the substrate can, for example, have a sheet format, i.e., be configured as a printing sheet, or be configured in the form of a material web, for example as a film. Cellulose or mechanical pulp or recycled fiber can, for example, be used as fibrous materials for paper production. A substrate made of paper can, for example, be a graphic paper, i.e., a regular paper, or a decorative paper or a wallpaper or a packing paper, for example paperboard, or a hygiene paper or a specialty paper, such as filter paper or a banknote paper. The nature of the surface of the relevant substrate to be printed can differ to the effect that it is not coated, or is coated, for example, with a primer before being transported to the relevant printing unit, or that the surface of the relevant substrate is configured to be coated or uncoated. A coated paper has a surface that is finished with a coating color, wherein the coating color is in particular made of pigments, binding agents and additives, and wherein a substrate treated with such a coating color generally forms a closed and smooth surface. A substrate to be printed in a printing machine comprising an inkjet print head may also be made of wood or glass or be configured as a hybrid print substrate having a surface, for example made of wood or a metallic material, to be printed. The surface of the relevant substrate to be printed can thus be configured to be absorbent, or also not absorbent, and exhibit favorable or less favorable bonding strength for the ink to be applied by way of an inkjet print head. In any case, the ink to be printed must in each case be matched to the substrate type and the surface finish thereof in order to achieve an acceptable print result.

In practical experience, a multiplicity of differing substrate types exists, which in particular differ from one another in terms of the material thereof and/or, at least at the point in time at which the surface thereof is printed, in terms of the finish of the surface to be printed from one another. When a printing machine comprising a plurality of inkjet print heads is to be switched from a first printing process for printing a first substrate type to another printing process for printing a second substrate type, considerable effort is involved for modifying this printing machine since, in general, at least an ink change has to be carried out, which is accompanied by thorough cleaning of the ink-conducting machine elements, such as tubes, valves, and the inkjet print heads themselves. Apart from the fact that this cleaning process incurs costs for cleaning agent and the disposal thereof and losses of the ink that is used during rinsing, this also means an increased risk of wear for the relevant inkjet print heads since it cannot be entirely precluded that inks will mix, deposit, and dry out in the relevant inkjet print heads. In addition, such an ink change takes several hours and usually also entails a new parameterization of the inkjet system or a calibration of the relevant printing system. As a result, the printing machine to be modified remains in an unproductive operating state over an extended period of time. Another uneconomical alternative, to avoid modification, would be to provide a particular printing machine only for the printing process of a single particular substrate type, or to arrange a plurality of selectively usable printing units in the printing machine, wherein only one particular printing unit of this plurality of printing units at a time is then in each case assigned to the printing operation of a particular substrate type, which, however, results in increased space requirement and excessively high investment costs for the relevant printing machine. Hereafter, a printing unit shall be understood to mean a structural machine unit, which comprises a plurality of inkjet print heads, arranged closely together, i.e., without using further transport means for the substrate to be printed, on a single transport device for the substrate to be printed, in a shared stand or housing.

SUMMARY

It is an object of some examples herein to provide a printing machine comprising a plurality of inkjet print heads arranged together in a printing unit, which can be flexibly used in an industrial digital printing operation for various substrates.

The object is achieved according to some examples herein by the printing machine discussed above, and in which the inkjet print heads arranged in the relevant printing unit are each configured so as to print an ink that comprises at least one colorant, both for the first substrate type and for the second substrate type.

The advantages achievable by the examples herein are in particular that the aforementioned drawbacks that otherwise exist are avoided, and the printing machine can be used very flexibly, without complex modification, for printing substrates of differing substrate types.

BRIEF DESCRIPTION OF THE DRAWINGS

Exemplary embodiments of the invention are illustrated in the drawings and will be described in greater detail below. The drawings show.

DETAILED DESCRIPTION

Without being limited thereto, the invention will be described hereafter by way of example based on a printing machine configured as a rotary printing machine, wherein this printing machine prints a substrate configured, for example, as a material web, i.e., a print substrate, by way of a plurality of inkjet print heads arranged together in a single printing unit. In the case of a printing machine printing a material web, this machine is preferably configured as a web-fed printing machine, and in particular as a web-fed rotary printing machine. In an alternative embodiment of the invention, it is provided that sheet-format substrates are printed, so that the printing machine is then configured as a sheet-fed printing machine, and preferably as a sheet-fed rotary printing machine.

Figure 1:
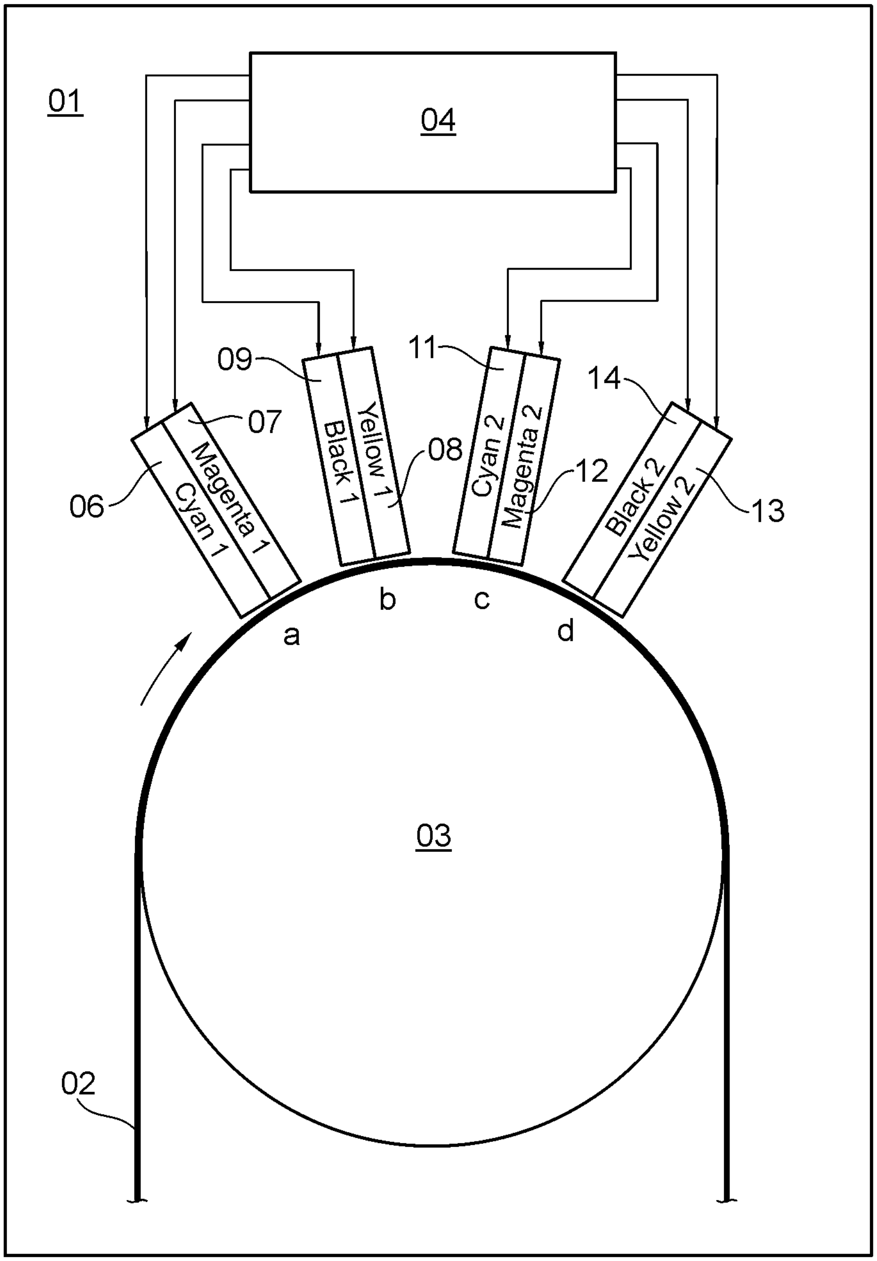
FIG. 1 a first arrangement variant of inkjet print heads in a printing unit of a printing machine.
Figure 2:
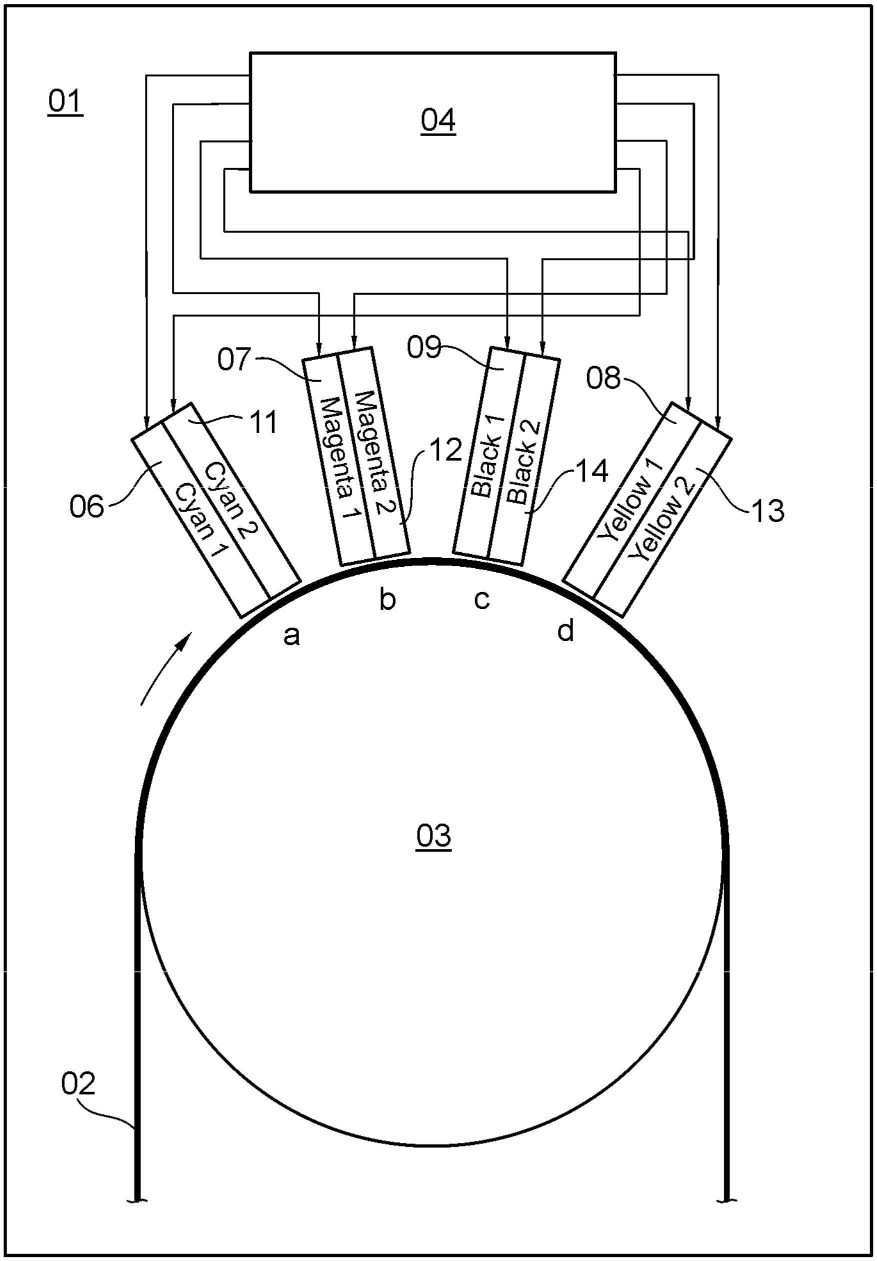
FIG. 2 a second arrangement variant of inkjet print heads in a printing unit of a printing machine.

FIGS. 1 and 2 each schematically show, in a simplified illustration and only in a section, a printing unit 01 of the printing machine according to the invention, for example for multicolor printing, wherein the printing unit 01 shown prints inks, wherein an ink shall be understood to mean a fluid that is dyed with at least one colorant and dyes the print substrate when applied thereto. These inks are, for example, the process colors cyan, magenta, yellow and black common in industrial processes; however, they may also have different colors, for example, a customized special color. Each of these inks having, for example, one of the process colors is printed in each case by one of the plurality of inkjet print heads 06; 07; 08; 09 arranged together in this printing unit 01, i.e., is applied to a substrate 02 that is moved relative to the relevant inkjet print heads 06; 07; 08; 09. Since the inks, as an alternative to the aforementioned process colors cyan, magenta, yellow and black, can each also be configured as another color-imparting fluid, it shall apply, in generalized terms, that the printing unit 01 prints at least one first ink and at least one second ink different from this first ink.

As mentioned, FIGS. 1 and 2, by way of example and in a drastically simplified illustration, show a printing machine configured as a web-fed rotary printing machine, wherein the printing unit 01 of this printing machine comprising the plurality of inkjet print heads 06; 07; 08; 09 comprises a transport cylinder 03, which rotates in the direction indicated by the respective rotational direction arrow, for transporting the substrate 02 configured as a material web. The plurality of inkjet print heads 06; 07; 08; 09 are arranged in the periphery of this transport cylinder 03, with the respective direction of action thereof applying ink, at a small distance of, for example, less than 3 mm with respect to the surface of the substrate 02 to be printed, preferably radially with respect to this transport cylinder 03. The inkjet print heads 06; 07; 08; 09 of the illustrated printing unit 01 are thus each arranged in such a way that, using these inkjet print heads, the substrate 02 that is moved relative to the inkjet print heads by way of a transport device configured, in this example, as a transport cylinder 03, is printed, or at least can be printed. In the printing unit 01, the position, based on the particular arrangement, of each of the inkjet print heads 06; 07; 08; 09 arranged in the periphery of the transport cylinder 03, in relation to a certain stationary position a; b; c; d in the printing machine in the transport path of the relevant substrate 02, in each case defines a printing location.

FIGS. 1 and 2 show two different arrangements of inkjet print heads 06; 07; 08; 09; 11; 12; 13; 14 in relation to each of the certain stationary positions a; b; c; d in the printing machine in the transport path of the relevant substrate 02. It is provided in the respective illustrated printing unit 01 that at least two inkjet print heads 06; 07; 08; 09; 11; 12; 13; 14 are arranged together or jointly at each of the printing locations, in relation to each of the certain stationary positions a; b; c; d in the printing machine in the transport path of the relevant substrate 02.

According to the first arrangement variant shown in FIG. 1, two inkjet print heads 06; 07 are arranged at the position a for printing a substrate 02 of a first substrate type, and two inkjet print heads 08; 09 are arranged at the position b for printing a substrate 02 of the same first substrate type. In this first arrangement variant, two inkjet print heads 11; 12 are arranged at the position c for printing a substrate 02 of a second substrate type, and two inkjet print heads 13; 14 are arranged at the position d for printing a substrate 02 of the same second substrate type. In this first arrangement variant, the inkjet print heads 06; 07; 08; 09; 11; 12; 13; 14 arranged jointly in each case at all stationary positions a; b; c; d in the transport path of the relevant substrate 02 are in each case configured so as to print inks having differing colors, and in particular differing process colors, in each case. In the example shown in FIG. 1, for example, the process colors cyan and magenta are applied at the position a and, for example, the process colors black and yellow are applied at the position b, in each case to a substrate 02 of a first substrate type, while, for example, the process colors cyan and magenta are applied at the position c and, for example, the process colors black and yellow are applied at the position d, in each case to a substrate 02 of a second substrate type.

In the alternative second arrangement variant according to FIG. 2, it is likewise provided that in each case at least two inkjet print heads 06; 07; 08; 09; 11; 12; 13; 14 are arranged in this printing unit 01 at each of the printing locations thereof, wherein, of the inkjet print heads 06; 07; 08; 09; 11; 12; 13; 14 that are each arranged jointly in relation to each of the certain stationary positions a; b; c; d in the printing machine in the transport path of the relevant substrate 02, in each case a first of the relevant inkjet print heads 06; 07; 08; 09; 11; 12; 13; 14 is controlled by a control unit 04 to print a substrate 02 of a first substrate type, and a second of these relevant inkjet print heads 06; 07; 08; 09; 11; 12; 13; 14 is controlled to print a substrate 02 of a second substrate type. The difference in relation to the first arrangement variant is that the inkjet print heads 06; 07; 08; 09; 11; 12; 13; 14 arranged jointly in each case at a certain stationary position a; b; c; d in the transport path of the relevant substrate 02 each apply inks having the same color, and in particular the same process color, to the particular substrate 02, and thus differing colors, in particular process colors, in each case are printed, or at least can be printed, at the consecutive stationary positions a; b; c; d in the transport path of the relevant substrate 02.

All inkjet print heads 06; 07; 08; 09 of the printing unit 01 shown in FIGS. 1 and 2 are controlled by a preferably digital, in particular programmed, control unit 04. According to the invention, it is now provided that the control unit 04 is configured so as to activate a first of these inkjet print heads 06; 07; 08; 09 arranged at the relevant printing location when a substrate 02 of a first substrate type moves past one of the relevant stationary positions a; b; c; d in the transport path of the relevant substrate 02, and so as to activate a second of these inkjet print heads 11; 12; 13; 14 arranged at the relevant printing location when a substrate 02 of a second substrate type moves past one of the relevant stationary positions a; b; c; d in the transport path of the relevant substrate 02, wherein the first substrate type and the second substrate type being configured to differ from one another in terms of the material thereof and/or the nature of a surface to be printed.

As an alternative to the transport cylinder 03 shown in each of FIGS. 1 and 2, the transport device can also be configured as at least one conveyor belt, on which the substrate 02 to be transported is arranged, in particular resting flat thereon. When the transport device is configured as at least one conveyor belt, the inkjet print heads 06; 07; 08; 09; 11; 12; 13; 14 of the relevant printing unit 01 are consecutively arranged in a row in a stationary manner in the transport direction of the relevant substrate 02, along the transport path thereof, wherein these inkjet print heads 06; 07; 08; 09; 11; 12; 13; 14 are arranged, with the respective direction of action thereof applying ink, at a small distance of, for example, less than 3 mm with respect to the surface of the substrate 02 to be printed, preferably orthogonally with respect to the relevant conveyor belt.

Irrespective of the particular specific configuration of the transport device, the inkjet print heads 06; 07; 08; 09; 11; 12; 13; 14 preferably extend across the entire width of the relevant substrate 02 to be printed, both in the first and in the second arrangement variant of these inkjet print heads 06; 07; 08; 09; 11; 12; 13; 14, wherein this width is oriented transversely to the transport direction of the relevant substrate 02. The inkjet print heads 06; 07; 08; 09; 11; 12; 13; 14 are thus in each case configured, for example, as a print bar comprising a nozzle field oriented toward the relevant substrate 02 to be printed, wherein this nozzle field comprises a multiplicity of nozzles, which each discharge ink and are preferably arranged consecutively in rows, and extends transversely to the transport direction of the relevant substrate 02, for example across the entire width thereof. Each of these nozzles discharges the ink in accordance with the activation thereof by a control signal of the control unit 04. Each of the inkjet print heads 06; 07; 08; 09; 11; 12; 13; 14 preferably operates in an inkjet printing method.

Figure 3:
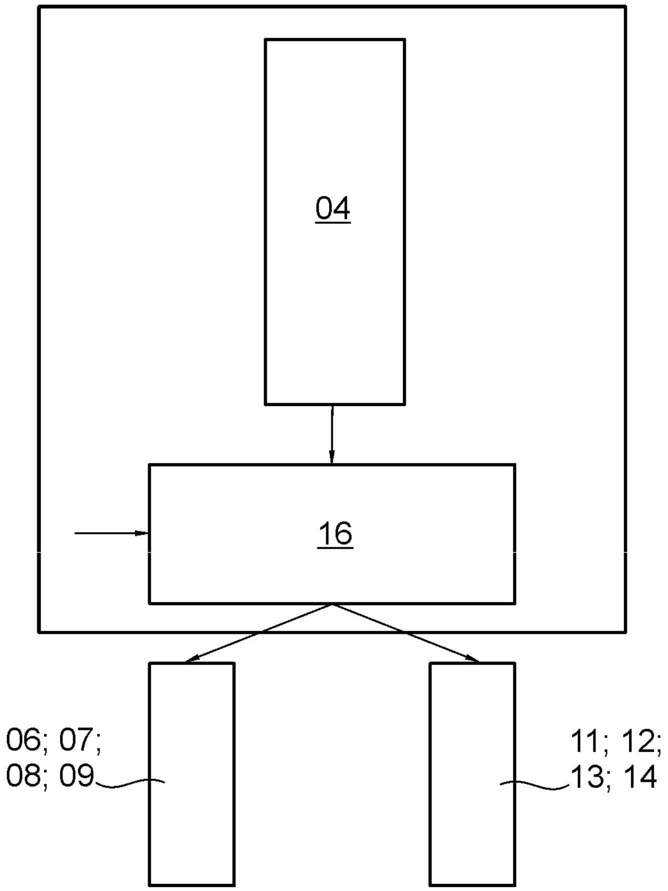
FIG. 3 a control unit controlling the inkjet print heads, comprising a distribution device for the data stream containing a control signal of the control unit.

FIG. 3, by way of example, shows the control unit 04 controlling the relevant inkjet print heads 06; 07; 08; 09; 11; 12; 13; 14 in conjunction with a distribution device 16, wherein this distribution device 16 is configured so as to conduct the respective control signal coming from the control unit 04 either to the inkjet print heads 06; 07; 08; 09 printing the substrate 02 of the first substrate type or to the inkjet print heads 11; 12; 13; 14 printing the substrate 02 of the second substrate type. The distribution device 16 can be switched either automatically, for example, after the particular substrate type has been detected by way of sensors, from a printing process for printing a first substrate type to another printing process for printing a second substrate type, and/or at a control console forming part of the relevant printing machine, for example, manually at an operating device by an operator of this printing machine from one substrate type to another, or it is switched in such a way, which is indicated in FIG. 3 by an input arrow at the distribution device 16. The direction of the particular data stream containing a control signal of the control unit 04 is indicated by directional arrows in FIG. 3.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A printing machine comprising a plurality of inkjet print heads (06; 07; 08; 09; 11; 12; 13; 14) arranged together in a printing unit (01), the inkjet print heads (06; 07; 08; 09; 11; 12; 13; 14) being controlled by a control unit (04) and arranged in such a way that, using the inkjet print heads, at least one substrate (02) that is moved relative to the inkjet print heads by way of a transport device can be printed with an ink discharged by the inkjet print heads; in the printing unit (01), at least two of the inkjet print heads (06; 07; 08; 09; 11; 12; 13; 14) being arranged adjacent to each other, in relation to a certain stationary position (a; b; c; d) in the printing machine in a transport path of a relevant substrate (02), and at a printing location assigned to one of the stationary positions (a; b; c; d) in the transport path of the relevant substrate (02); the control unit (04) being configured so as to activate a first of the inkjet print heads (06; 07; 08; 09) arranged at a relevant printing location when a substrate (02) of a first substrate type moves past a relevant stationary position (a; b; c; d) in the transport path of the relevant substrate (02), and so as to activate a second of the inkjet print heads (11; 12; 13; 14) arranged at the relevant printing location when a substrate (02) of a second substrate type moves past the relevant stationary position (a; b; c; d)

in the transport path of the relevant substrate (02); and the first substrate type and the second substrate type being configured to differ from one another in terms of a material thereof and/or a nature of a surface to be printed, characterized in that the inkjet print heads (06; 07; 08; 09; 11; 12; 13; 14) arranged in the printing unit (01) are each configured so as to print an ink that comprises at least one colorant, both for the first substrate type and for the second substrate type, and in that, in conjunction with the control unit (04) controlling the inkjet print heads (06; 07; 08; 09; 11; 12; 13; 14), a distribution device (16) is provided, the distribution device (16) being configured to conduct a control signal coming from the control unit (04) either to the inkjet print heads (06; 07; 08; 09) printing the substrate (02) of the first substrate type or to the inkjet print heads (11; 12; 13; 14) printing the substrate (02) of the second substrate type.

2. The printing machine according to claim 1, characterized in that the transport device is configured as a transport cylinder (03), on an outer cylindrical surface of which the substrate (02) to be transported is arranged resting flat thereon.

3. The printing machine according to claim 2, characterized in that the plurality of inkjet print heads (06; 07; 08; 09) are arranged in a periphery of the transport cylinder (03), with the respective direction of action thereof applying ink, at a distance of less than 3 mm with respect to a surface of the substrate (02) to be printed, radially with respect to the transport cylinder (03).

4. The printing machine according to claim 1, characterized in that the transport device is configured as a conveyor belt, on which the substrate (02) to be transported is arranged resting flat thereon.

5. The printing machine according to claim 1, characterized in that the distribution device (16) is switched, or at least can be switched, automatically, after the substrate type has been detected by way of one or more sensors, from a printing process for printing the first substrate type to another printing process for printing the second substrate type.

6. The printing machine according to claim 1, characterized in that the distribution device (16) is switched, or at least can be switched, at a control console, which forms part of the printing machine, based on receipt of an operator input received at an operating device of the printing machine, from printing one of the first or second substrate type to another of the first or second substrate type.

7. The printing machine according to claim 1, characterized in that the inkjet print heads (06; 07; 08; 09; 11; 12; 13; 14) arranged adjacent to each other in each case at all stationary positions (a; b; c; d) in the transport path of the relevant substrate (02) are each configured so as to apply inks having differing process colors to the relevant substrate (02).

8. The printing machine according to claim 1, characterized in that, of the inkjet print heads (06; 07; 08; 09; 11; 12; 13; 14) that are each arranged adjacent to each other in relation to each of the certain stationary positions (a; b; c; d) in the printing machine in the transport path of the relevant substrate (02), in each case a first of the relevant inkjet print heads (06; 07; 08; 09; 11; 12; 13; 14) is controlled by the control unit (04) to print a substrate (02) of the first substrate type, and a second of the relevant inkjet print heads (06; 07; 08; 09; 11; 12; 13; 14) is controlled to print a substrate (02) of the second substrate type, so that the inkjet print heads (06; 07; 08; 09; 11; 12; 13; 14) arranged adjacent to each other in each case at a certain stationary position (a; b; c; d) in the transport path of the relevant substrate (02) are in each case configured so as to apply the same process color to the relevant substrate (02).

9. The printing machine according to claim 1, characterized in that the inkjet print heads (06; 07; 08; 09; 11; 12; 13; 14) are arranged so as to extend across a width of the relevant substrate (02) to be printed, the width being oriented transversely to a transport direction of the relevant substrate (02).

10. The printing machine according to claim 1, characterized in that the inkjet print heads (06; 07; 08; 09; 11; 12; 13; 14) arranged in the printing unit (01) are configured so as to print in each case the process colors cyan, magenta, yellow and black, both for the first substrate type and for the second substrate type.

11. The printing machine according to claim 1, characterized in that the inkjet print heads (06; 07; 08; 09; 11; 12; 13; 14) arranged in the printing unit (01) are configured so as to print in each case a customized special color, both for the first substrate type and for the second substrate type.

12. The printing machine according to claim 1, characterized in that the printing machine is configured as a sheet-fed printing machine printing the substrate (02) configured as a print sheet.

13. The printing machine according to claim 1, characterized in that the printing machine is configured as a web-fed printing machine printing the substrate (02) configured as a material web.

14. The printing machine according to claim 1, characterized in that the printing machine is configured so as to print a substrate (02) made of a paper produced from at least one fibrous material, or that the printing machine is configured so as to print a substrate (02) made of a plastic material, or that the printing machine is configured so as to print a substrate (02) made of metal, or that the printing machine is configured so as to print a substrate (02) made of wood.

* * * * *